Patented May 24, 1949

2,471,394

UNITED STATES PATENT OFFICE 2,471,394

SALICYLATE AND SUCCINATE THERAPEUTIC PREPARATIONS

Richard Gubner, Brooklyn, N. Y.

No Drawing. Application September 30, 1946, Serial No. 700,349

15 Claims. (Cl. 167—65)

1

This invention relates to pharmaceutical compositions adapted for the administration of certain medicaments ordinarily having a depressant effect on tissue metabolism or respiration, such as salicylates as acetylsalicylic acid, sodium salicylate, and the like, when administered in large and protracted dosages, in which compositions the depressant ingredient is associated with at least one non-toxic salt of the aliphatic dicarboxylic acid succinic acid, or the free acid itself, present in such amount relative to the tissue respiration depressant ingredient to permit the latter's administration in such dosage and protracted frequency that would otherwise cause the indicated and other toxic effects and manifestations if it were administered without the accompanying amount of the polycarboxylic acid substance.

Salicylates, as sodium salicylate, and acetylsalicylic acid (aspirin), and the like, can be effective in the treatment and relief of such ailments as acute rheumatic fever and rheumatic arthritis. Other similarly effective salicylic acid substances embrace salicylic acid itself, suitable esters of it as the lower alkyl esters such as ethyl salicylate, salts of salicylic acid as other alkali metal salts or its ammonium salt or an alkaline earth salt as calcium salicylate, or acyl derivatives of the acid in addition to aspirin as methylene-citrylsalicylic acid, or the salicylic acid ester of salicylic acid, or esters of such acyl derivatives. All of such effective salicylic acid drugs are herein broadly referred to as a salicylate drug effective for the relief of rheumatic fever, or rheumatism, and rheumatic arthritis. However, effective therapy in these conditions with such salicylate drug requires considerably large dosages, for example, of acetylsalicylic acid, of the order of 4 to 8, and even up to 12, grams daily (given in three or four or more, for example, six, doses over the day) to build up and maintain an effective minimum blood level such as 350 micrograms of the drug per 100 cc. of blood for a period of as long as one month or more.

However, the use of acetylsalicylic acid or other such salicylate drug at such dosage range and frequency of administration is patently unsafe because of resulting interference with the essential, normal physiological functions, as by giving rise to such toxic effects as inhibiting the normal activity of tissue respiratory enzymes functioning, for example, in the liver or other tissues, provoking nausea, vomiting, and other toxic manifestations, and, in some cases, even causing death.

According to this invention these toxic effects of such tissue respiration depressant substances are overcome by accompanying them in their use by certain succinic acid substances such as a non-toxic salt of such acid, for example, calcium

2 succinate, or the free acid as succinic acid itself, and the like, as hereinbelow further described.

The invention may be illustrated by, but not restricted to, the following example:

76 parts of calcium succinate powder are intimately mixed with 100 parts of acetylsalicylic acid U. S. P. powder and then granulated and thereafter incorporated with a suitable tableting binder and tabulated in known manner into tablets containing 2.8 grains of calcium succinate and 3.7 grains of aspirin each. This composition administered at a dosage regimen of 8 to 15 tablets daily for two months or more shows none of the usual toxic manifestations of aspirin when attempted to be administered alone in the same amounts over the same regimen.

While the invention has been exemplified by a particularly effective composition having a preferred ratio of about four parts of aspirin to three parts of calcium succinate, the amounts of the latter may be varied somewhat between the range of from about one-third to above, for example, as much as ten times, the quantity of the aspirin used, although the more advantageous range is for the calcium succinate to be from about one-half to about equal the quantity of the aspirin.

Moreover, while the above particularly effective composition within the invention is prepared by the use of calcium succinate along with the indicated amount of the aspirin within the above noted ranges, there can be used instead of the calcium succinate, the equivalent amount of the free succinic acid or of any other similarly non-toxic, alkaline earth or alkali metal or ammonium salt of it, for example, sodium succinate or ammonium succinate, and the like similarly effective to counteract the tissue respiration inhibiting effect of the salicylates of the type hereinabove referred to.

Accordingly, this free, aliphatic dicarboxylic acid, as well as any of its above disclosed types of salts, suitable as an agent to counteract the tissue respiration inhibiting effect of medicaments of the type just above mentioned, are referred to in this specification and the appending claims as succinic acid substance capable of counteracting pharmaceutical, tissue respiration inhibition. This expression embraces succinic acid substances represented by the general formula

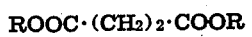

in which any of the elements R is a cation selected from hydrogen and the alkaline cations as an alkali metal as sodium, the ammonium radical, and any two of them jointly as an alkaline earth metal as calcium. The succinic acid and its such salts are referred to generically herein as a succinic acid substance, so that the expression "succinic acid substance" as used herein and in the appending claims represents succinic acid and the monovalent and divalent alkaline cation salts of it, namely, the non-toxic, alkaline earth and alkali metal and ammonium salts of succinic acid.

The compositions of the invention are put up in any suitable dosage form such as tablets, or the common powder mix papers, or capsules, for oral administration. They can also be administered intravenously. For intravenous use or in the capsules or powder mix papers, the composition need only consist of the selected salicylate of the type described herein as having a depressant effect on tissue respiration or metabolism and the selected succinic acid substance of the type disclosed, as the calcium, or sodium, or ammonium succinate, or succinic acid. In the case of the tablet, there is included a suitable binder compatible with the two principal ingredients and non-toxic under the regimen of their administration. In any dosage form, there may be included also a suitable diluent likewise compatible with the two principal ingredients and non-toxic when taken in the amount and frequency resulting from the administration regimen of the preparation.

While there has been described above a combination of aspirin and calcium succinate, that is effective in the treatment and relief of rheumatic fever and rheumatic arthritis, other combinations are also embraced in the invention, for example, any of the other types of succinates mentioned or the free acid, or any mixture of them.

While the invention has been described herein with reference to certain specific embodiments of it, it is understood that numerous modifications, substitutions, or variations may be made therefrom within the scope of the appending claims.

What is claimed is:

1. A pharmaceutical composition effective for relief of rheumatic fever, rheumatism and rheumatic arthritis by containing a salicylate drug effective for relief of said ailments, said preparation being effective for such relief at a protracted dosage regimen including grams of salicylate daily and for days at a time and under which its salicylate content would provoke toxic manifestations when administered alone, and at such dosage regimen effective without toxic manifestations because of its therapeutic ingredient contents consisting essentially of its salicylate content and a non-toxic succinic acid substance having the formula ROOC·CH$_2$·CH$_2$·COOR wherein R is a cation which is a member of the class consisting of hydrogen, an alkali metal, the ammonium radical, and an alkaline earth metal, the latter then being represented by both elements R jointly, and said succinic acid substance being in such proportion to the salicylate content to permit its administration without the toxic manifestations accountable to the salicylate at the protracted dosage regimen, and in the range for the succinic substance, calculated as calcium succinate, of from about one-third to about ten times the quantity of salicylate, calculated as acetyl salicylic acid, said preparation being free of effective purgative and laxative components when the salicylate is an alkali metal salt of salicylic acid and the succinic acid substance is an alkali metal succinate, and otherwise free of ingredients that would cause the preparation to provoke toxic manifestations when taken at the protracted dosage regimen.

2. A pharmaceutical composition effective for relief of rheumatic fever, rheumatism and rheumatic arthritis by containing a salicylate drug effective for relief of said ailments, said preparation being effective for such relief at a protracted dosage regimen including grams of salicylate daily for days at a time and under which its salicylate content would provoke toxic manifestations when administered alone, and at such protracted dosage regimen effective without toxic manifestations because of its therapeutic ingredient contents consisting essentially of its salicylate content and a non-toxic succinic acid substance which is a member of the class consisting of succinic acid and the ammonium, alkali metal, and alkaline earth salts of succinic acid, and in such proportion to the salicylate content to permit its administration without the toxic manifestations accountable to the salicylate at such dosage regimen, and in the range for the succinic substance, calculated as calcium succinate, of from about one-third to about ten times the quantity of salicylate, calculated as acetyl salicylic acid, said preparation otherwise being free of effective laxative and purgative and other ingredients that would cause the preparation to provoke toxic manifestations when taken at such protracted dosage regimen.

3. A composition effective for relief of rheumatic fever, rheumatism and rheumatic arthritis by containing a salicylate drug effective for relief of said ailments, said preparation being effective for such relief at a protracted dosage regimen and under which its salicylate content would provoke toxic manifestations when administered alone, and at such protracted dosage regimen without such toxic manifestations by accompanying its salicylate content with a non-toxic alkaline earth salt of succinic acid and in such proportion to its salicylate content to permit its administration without toxic manifestations accountable to the salicylate at such dosage regimen.

4. A composition as claimed in claim 3, wherein the alkaline earth salt of succinic acid is calcium succinate.

5. A composition as claimed in claim 4, wherein the salicylate is acetyl salicylic acid.

6. A composition as claimed in claim 3, wherein the salicylate is acetyl salicylic acid.

7. A composition effective for relief of rheumatic fever, rheumatism and rheumatic arthritis by containing acetyl salicylic acid, said preparation being effective for such relief at a protracted dosage regimen and under which the acetyl salicylic acid would provoke toxic manifestations when administered alone, and at such protracted dosage regimen without such toxic manifestations by accompanying the acetyl salicylic acid with calcium succinate within the range of from about one-third to about ten times the quantity of the acetyl salicylic acid.

8. A composition as claimed in claim 7, wherein there are about four parts of acetyl salicylic acid to about three parts of calcium succinate.

9. A composition as claimed in claim 7, wherein there are about one to about two parts of acetyl salicylic acid to about one part of calcium succinate.

10. A composition as claimed in claim 7, wherein there are about three parts of acetyl salicylic acid to about at least one part of calcium succinate.

11. A composition effective for relief of rheumatic fever, rheumatism and rheumatic arthritis by containing a salicylate drug effective for relief of said ailments, said preparation being effective for such relief at a protracted dosage regimen and under which its salicylate content would provoke toxic manifestations when administered alone, and at such protracted dosage regimen without such toxic manifestations by accompanying its salicylate content with succinic acid and in such proportion to its salicylate content to permit its administration without toxic manifestations accountable to the salicylate at such dosage regimen.

12. A preparation as claimed in claim 11, wherein the succinic acid is present within the range, calculated as calcium succinate, of from about one-third to about ten times the quantity of the salicylate, calculated as acetyl salicylic acid.

13. A composition as claimed in claim 12, wherein the salicylate is acetyl salicylic acid.

14. A pharmaceutical composition effective for relief of rheumatic fever, rheumatism and rheumatic arthritis by containing acetyl salicylic acid, said preparation being effective for such relief at a protracted dosage regimen including grams of acetyl salicylic acid daily and for days at a time and under which it would provoke toxic manifestations when administered alone, and at such dosage regimen effective without toxic manifestations because of its therapeutic ingredient contents consisting essentially of the acetyl salicylic acid and a non-toxic alkali metal succinate in such proportion to the acetyl salicylic acid to permit its administration without the toxic manifestations accountable to it at the protracted dosage regimen, and in the range for the succinate, calculated as calcium succinate, of from about one-third to about ten times the quantity of acetyl salicylic acid, said preparation being free of effective purgative and laxative components and other ingredients that would cause the preparation to provoke toxic manifestations when taken at the protracted dosage regimen.

15. A composition as claimed in claim 14, wherein the succinate is sodium succinate.

RICHARD GUBNER.

REFERENCES CITED

The following references are of record in the file of this patent:

UNITED STATES PATENTS

| Number | Name | Date |
|---|---|---|
| 345,867 | Sonstadt | July 20, 1886 |
| 1,081,069 | Viquerat | Dec. 9, 1913 |
| 1,634,315 | Banker | July 5, 1927 |
| 1,684,336 | Hoffmuller | Sept. 11, 1928 |
| 1,845,486 | Crossley | Feb. 16, 1932 |
| 2,101,867 | Miller et al. | Dec. 14, 1937 |
| 2,208,120 | Coleman | July 16, 1940 |
| 2,283,817 | Martin | May 19, 1942 |
| 2,320,479 | Sperti | June 1, 1943 |
| 2,320,480 | Sperti | June 1, 1943 |
| 2,385,365 | Link | Sept. 25, 1945 |

FOREIGN PATENTS

| Number | Country | Date |
|---|---|---|
| 10,460 | Great Britain | 1911 |
| 10,667 | Australia | 1932 |

OTHER REFERENCES

Marquardt, Pharmaceutical Abstracts, vol. V, No. 5, May 1939, pages 222–223. (Copy in Div. 43.)

J. A. P. A., Prac. Pharm. Ed., May 1946, page 234. (Copy in P. O. S. L.)

Dube et al., Can. Med. Assoc. J., Feb. 1946, page 103. (Copy in Division 43.)

Gutman, Modern Drug Encyclopedia, page 687, 2nd edition, pub. by New Modern Drug, New York, 1941. (Copy in Division 43.)

Hager, pages 223, 224, vol. I, Handbuch der Pharmazeutischen Praxis, Berlin, J. Springer, 1925. (Copy in Div. 43.)

Jenkins et al., Chemistry of Organic Medicinal Products, 2nd ed., John Wiley and Sons, New York, page 265. (Copy in Division 43.)

Raymer, Pharmacal Company, 1925 catalogue, Phila., page 49. (Copy in file.)